UNITED STATES PATENT OFFICE.

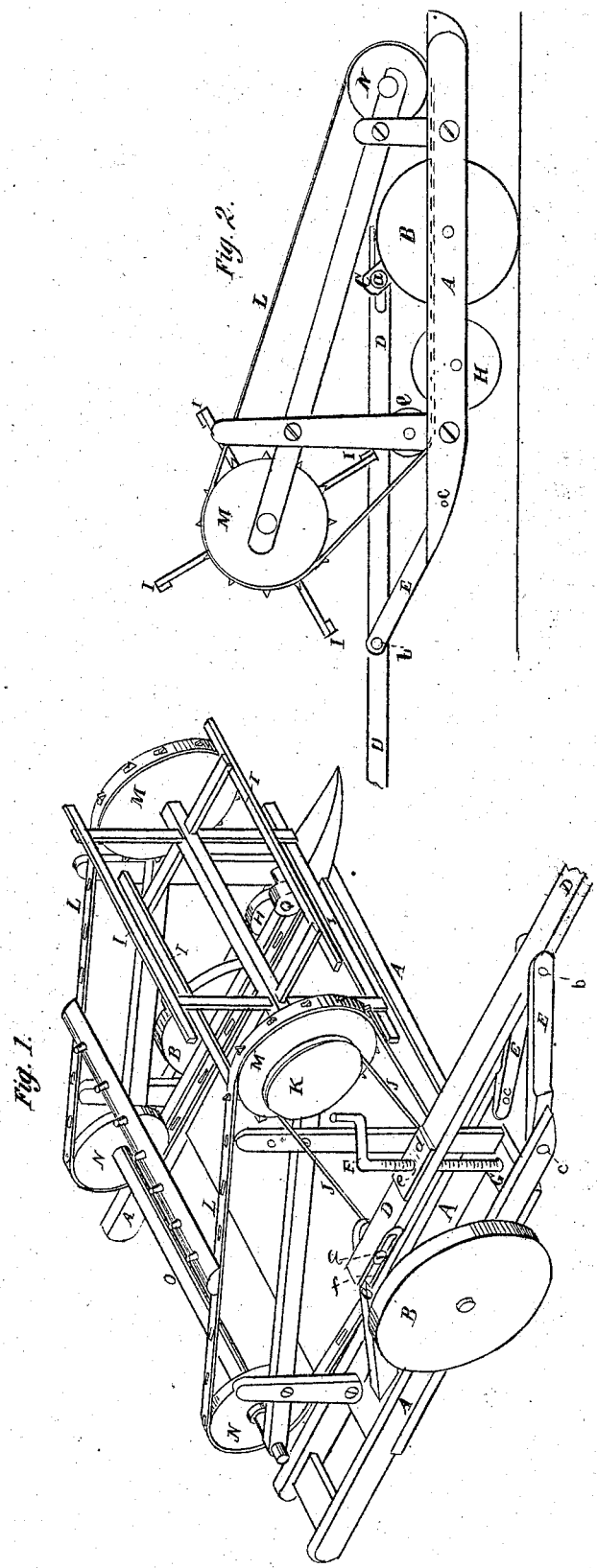

LARKIN L. MOORE, OF PETERSBURG, VIRGINIA.

IMPROVEMENT IN HARVESTING-MACHINES.

Specification forming part of Letters Patent No. 15,569, dated August 19, 1856.

*To all whom it may concern:*

Be it known that I, LARKIN L. MOORE, of Petersburg, in the county of Dinwiddie and State of Virginia, have invented certain new and useful Improvements in Harvesting-Machines; and I do hereby declare the following to be a full, clear, and exact description of the same, reference being had to the accompanying drawings, making a part thereof, in which—

Figure 1 represents a perspective view, and Fig. 2 represents a side view, of the machine.

Similar letters of reference, where they occur in the separate figures, denote like parts in both.

The nature of my invention relates solely to the manner of hanging the frame so that it may be raised and lowered for cutting high or low.

To enable others skilled in the art to make and use my invention, I will proceed to describe the same with reference to the drawings.

A represents the frame of the machine, supported on the two main wheels B. On that side of the machine on which the operator stands or sits is arranged a standard or stud, C, in the top of which, or near the top, is placed a screw or pin, $a$, which the rear forked or slotted end, $f$, of the tongue D straddles or plays upon.

E E are a pair of hounds, which, instead of being fast to either the tongue or the frame-pieces A, are pivoted to both at the points $b\ c\ c$.

F is a screw-winch, passing through a plate, $d$, having an oblong hole in it and a traveling nut, $e$, (in dotted lines,) underneath said plate, both arranged on the tongue and through a similar oblong or enlarged hole in a cross-piece, G, below it, and has a nut or button upon its lower end, underneath said cross-piece, so that by turning the winch the distance between the tongue D and the cross-piece G (which latter is really a part of the frame) is varied in a vertical line, and to allow for this vertical variation the hounds are pivoted and the rear of tongue slotted, as above described. The rear of the tongue always maintains the same relative position vertically to the supporting wheels B, and the point of the tongue is held in or about the same height from the ground by the breast-straps, to which the tongue is fastened to the horses. The point and rear of the tongue therefore having practically a fixed vertical position, the frame can be raised up upon or let down from the said tongue, and thus regulate the height at which the cutters attached to the frame shall work. This suspending from the tongue would be simple enough were it not necessary for the hounds to be stiff in a lateral direction, for turning and guiding the machine, and, being thus rigid, the tongue must have provision made for its movement in the line of its length, as the points $b\ c\ c$ may stand in a more or less vertical plane. This provision is made by the oblong or enlarged hole and traveling nut, above described, which allow the winch to move back and forth, as the tongue must move as it is raised or lowered by the winch. On the opposite side of the machine—viz., that side which runs next the standing grain—in addition to a main supporting-wheel B, I have arranged in advance of said supporting-wheel what I term a "lazy wheel," H, of less diameter than the supporting-wheel, and entirely useless except when the main wheel B drops into a furrow, gully, or other depression, when it immediately catches and supports that end of the frame and prevents the cutters from striking into or against the ground until the main wheel rises out of such depression, when it again becomes superfluous until a similar necessity for its assistance arises.

I is the reel, which may be driven by the endless band J, passing around a pulley on the shaft of the main wheel B and around a similar pulley, K, on the reel-shaft. An endless rake is caused to move along the platform to sweep off the cut grain that falls upon it by means of the two endless rake-belts L, passing over pulleys M on the ends of the reel-shaft and over pulleys N, arranged on the rear of the platform on the shaft O, and, in order to bring the rakes P in close proximity to the platform, the rake-belts are caused to pass down under friction-pulleys Q, arranged on the front portion of the platform. The reel and rake frame are one, and said frame is so connected with the main frame as to throw both the reel and rake forward or back of the cutters, as may be required; but as this feature would have to be the subject-matter of a separate application for Letters Patent a more detailed description of it here would be out of place.

Having thus fully described the nature of my invention, what I claim therein as new, and desire to secure by Letters Patent, is—

Adjusting the frame on its supporting-wheels for cutting higher or lower by uniting the frame and tongue by means of the pivoted hounds E, screw-winch F, and pin $a$, passing through a slot in the rear of the tongue into the standard C, the above parts being arranged and operating in the manner and for the purpose set forth.

LARKIN L. MOORE.

Witnesses:
 A. B. STOUGHTON,
 E. COHEN.